D. B. NEAL.
Evaporating Pan.
No. 34,644.  Patented March 11, 1862.
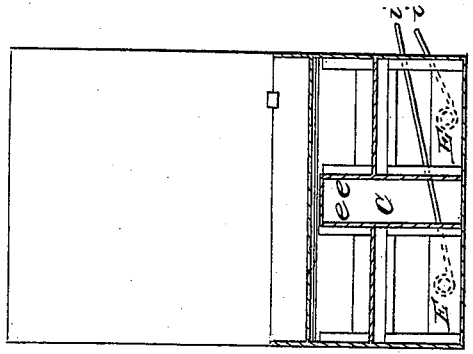
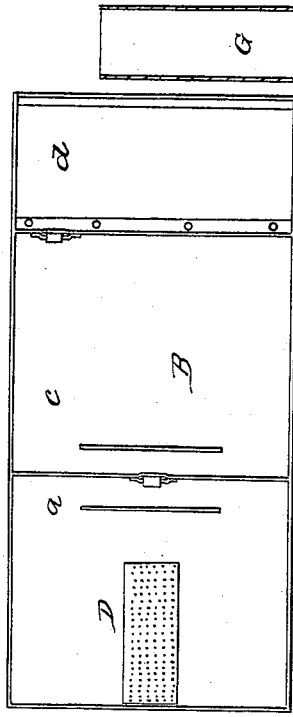
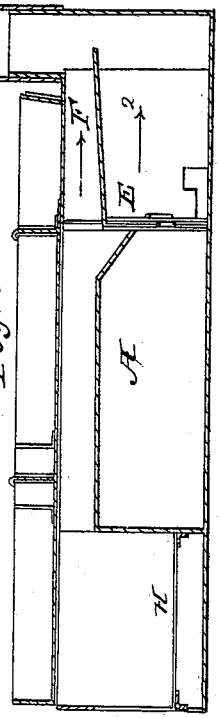
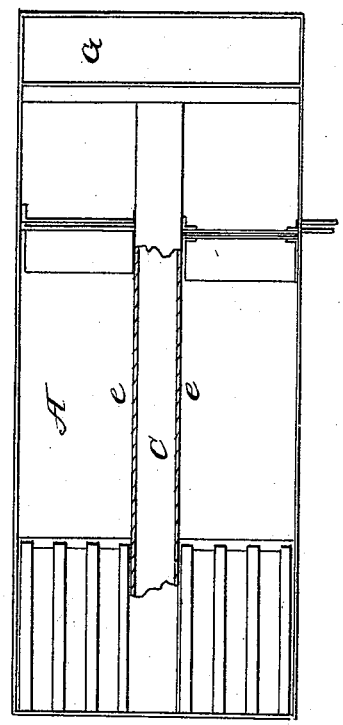

UNITED STATES PATENT OFFICE.

DANIEL B. NEAL, OF MOUNT GILEAD, OHIO.

IMPROVEMENT IN EVAPORATING-PANS FOR SACCHARINE JUICES.

Specification forming part of Letters Patent No. 34,644, dated March 11, 1862.

*To all whom it may concern:*

Be it known that I, DANIEL B. NEAL, of Mount Gilead, in the county of Morrow and State of Ohio, have invented certain new and useful Improvements in Sugar-Evaporators; and I do hereby declare that the following is a full, clear, and exact description of the same, reference being had to the accompanying drawings, and to the letters of reference marked thereon.

The nature of my invention in this case consists more particularly in the construction of the pan, which has several apartments, the front apartments being made of sheet-iron, while the last is made of cast-iron, for the purpose of boiling the sirup slowly at a low temperature, which is very necessary for making good sirup.

In the annexed drawing, making part of this specification, A represents the furnace, which may be made of brick, stone, or metal, and of any suitable size.

B represents the pan, which is placed over the furnace, for holding and boiling the juice. This pan has three compartments, $a$, $c$, and $d$. The first compartment is provided with an elevated strainer, D, into and through which the juice passes on its way to said compartment. The compartment $a$ is immediately over the fire-pot H, and receives the greatest amount of heat. The juice, after being sufficiently boiled in the first, passes through a door to the second compartment, and thence into the third, which is made of cast-iron. The first two are made of wrought-iron, while the last, $d$, is made of cast-iron, for boiling the sirup at a lower temperature with the same heat than can be the case with sheet metal.

The furnace is provided with two separate walls, $e e$, internally, which form an air-space, C, between them. This air-space is immediately under the center of the pan, and runs its entire length. It acts as a cooler for raising the scum on the juice as it is being boiled.

F represents a plate under the pan $d$.

E E are two dampers, one on each side of the air-chamber C and under the forward end of the pan $d$.

$i i$ are rods for operating the dampers. When the dampers are raised, the draft takes the direction of arrow 2, but when they are down it takes the direction indicated by arrow 1, and passes directly under the pan $d$. By this arrangement of the dampers the heat is thrown under one side of the pan $d$, or it may be thrown under both sides or removed from both sides, thus effectually governing the temperature of the sirup in this pan.

What I claim is—

The employment of the pan constructed, as described, of combined sheet and cast iron, whereby the sirup may be boiled at a lower temperature, with the same fire, than the juice, as is herein specified.

In witness that I claim the foregoing I have hereunto set my hand in the presence of witnesses.

DANIEL B. NEAL.

Witnesses:
T. H. DALSYNYSEE,
A. H. WRENN.